United States Patent
Dror et al.

(10) Patent No.: US 10,324,277 B2
(45) Date of Patent: *Jun. 18, 2019

(54) MINIATURE TELEPHOTO LENS ASSEMBLY

(71) Applicant: Corephotonics Ltd., Tel-Aviv (IL)

(72) Inventors: Michael Dror, Nes Ziona (IL);
Ephraim Goldenberg, Ashdod (IL);
Gal Shabtay, Tel Aviv (IL)

(73) Assignee: Corephotonics Ltd., Tel Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/817,235

(22) Filed: Nov. 19, 2017

(65) Prior Publication Data

US 2018/0120541 A1    May 3, 2018

Related U.S. Application Data

(63) Continuation of application No. 15/418,925, filed on Jan. 30, 2017, now Pat. No. 9,857,568, which is a
(Continued)

(51) Int. Cl.
*G02B 13/00* (2006.01)
*G02B 13/02* (2006.01)
(Continued)

(52) U.S. Cl.
CPC ......... *G02B 13/0045* (2013.01); *G02B 1/041* (2013.01); *G02B 9/60* (2013.01);
(Continued)

(58) Field of Classification Search
CPC .. G02B 13/0045; G02B 9/60; G02B 27/0025; G02B 5/005; G02B 13/02; G02B 1/041;
(Continued)

(56) References Cited

U.S. PATENT DOCUMENTS

| | | |
|---|---|---|
| 2,354,503 A | 7/1944 | Cox |
| 2,378,170 A | 6/1945 | Aklin |

(Continued)

FOREIGN PATENT DOCUMENTS

| | | |
|---|---|---|
| CN | 104297906 A | 1/2015 |
| JP | 1966006865 | 4/1966 |

(Continued)

OTHER PUBLICATIONS

A compact and cost effective design for cell phone zoom lens, Chang et al., Sep. 2007, 8 pages.
(Continued)

*Primary Examiner* — Evelyn A Lester
(74) *Attorney, Agent, or Firm* — Nathan and Associates; Menachem Nathan

(57) ABSTRACT

An optical lens assembly includes five lens elements and provides a TTL/EFL<1.0. In an embodiment, the focal length of the first lens element f1<TTL/2, an air gap between first and second lens elements is smaller than half the second lens element thickness, an air gap between the third and fourth lens elements is greater than TTL/5 and an air gap between the fourth and fifth lens elements is smaller than about 1.5 times the fifth lens element thickness. All lens elements may be aspheric.

24 Claims, 6 Drawing Sheets

Related U.S. Application Data continuation-in-part of application No. 15/170,472, filed on Jun. 1, 2016, now Pat. No. 9,568,712, which is a continuation of application No. 14/932,319, filed on Nov. 4, 2015, now Pat. No. 9,402,032, which is a continuation of application No. 14/367,924, filed as application No. PCT/IB2014/062465 on Jun. 20, 2014, now abandoned.

(60) Provisional application No. 61/842,987, filed on Jul. 4, 2013.

(51) Int. Cl.
*G02B 9/60* (2006.01)
*G02B 27/00* (2006.01)
*G02B 1/04* (2006.01)
*G02B 27/64* (2006.01)
*G02B 5/00* (2006.01)
*G02B 9/00* (2006.01)
*H04N 101/00* (2006.01)

(52) U.S. Cl.
CPC ......... *G02B 13/02* (2013.01); *G02B 27/0025* (2013.01); *G02B 27/646* (2013.01); *G02B 5/005* (2013.01); *G02B 9/00* (2013.01); *G02B 13/002* (2013.01); *H04N 2101/00* (2013.01); *H04N 2201/00* (2013.01); *Y10T 29/4913* (2015.01)

(58) Field of Classification Search
CPC ...... G02B 13/002; G02B 9/00; G02B 27/646; H04N 2201/00; Y10T 29/4913
USPC .......................... 359/714, 739, 740, 763, 764
See application file for complete search history.

(56) References Cited

U.S. PATENT DOCUMENTS

| | | | |
|---|---|---|---|
| 2,441,093 A | 5/1948 | Aklin |
| 3,388,956 A | 6/1968 | Eggert et al. |
| 3,524,700 A | 8/1970 | Eggert et al. |
| 3,864,027 A | 2/1975 | Harada |
| 3,942,876 A | 3/1976 | Betensky |
| 4,134,645 A | 1/1979 | Sugiyama et al. |
| 4,338,001 A | 7/1982 | Matsui |
| 4,465,345 A | 8/1984 | Yazawa |
| 5,000,551 A | 3/1991 | Shibayama |
| 5,172,235 A | 12/1992 | Wilm et al. |
| 5,946,142 A | 8/1999 | Hirata et al. |
| 6,654,180 B2 | 11/2003 | Ori |
| 7,187,504 B2 | 3/2007 | Horiuchi |
| 7,515,351 B2 | 4/2009 | Chen et al. |
| 7,564,635 B1 | 7/2009 | Tang |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Iyama |
| 7,738,186 B2 | 6/2010 | Chen et al. |
| 7,777,972 B1 | 8/2010 | Chen et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 8,000,031 B1 | 8/2011 | Tsai |
| 8,004,777 B2 | 8/2011 | Sano |
| 8,046,026 B2 | 10/2011 | Koa |
| 8,072,695 B1 | 12/2011 | Lee et al. |
| 8,077,400 B2 | 12/2011 | Tang |
| 8,149,523 B2 | 4/2012 | Ozaki |
| 8,218,253 B2 | 7/2012 | Tang |
| 8,228,622 B2 | 7/2012 | Tang |
| 8,233,224 B2 | 7/2012 | Chen |
| 8,253,843 B2 | 8/2012 | Lin |
| 8,279,537 B2 | 10/2012 | Sato |
| 8,310,768 B2 | 11/2012 | Lin et al. |
| 8,363,337 B2 | 1/2013 | Tang et al. |
| 8,395,851 B2 | 3/2013 | Tang et al. |
| 8,400,717 B2 | 3/2013 | Chen et al. |
| 8,451,549 B2 | 5/2013 | Yamanaka et al. |
| 8,503,107 B2 | 8/2013 | Chen et al. |
| 8,508,860 B2 | 8/2013 | Tang et al. |
| 8,514,502 B2 | 8/2013 | Chen |
| 8,731,390 B2 | 5/2014 | Goldenberg et al. |
| 8,780,465 B2 | 7/2014 | Chae |
| 8,810,923 B2 | 8/2014 | Shinohara |
| 8,854,745 B1 | 10/2014 | Chen |
| 8,958,164 B2 | 2/2015 | Kwon et al. |
| 9,185,291 B1 | 11/2015 | Shabtay et al. |
| 9,229,194 B2 | 1/2016 | Yoneyama et al. |
| 9,235,036 B2 | 1/2016 | Kato et al. |
| 9,279,957 B2 | 3/2016 | Kanda et al. |
| 9,402,032 B2* | 7/2016 | Dror ........................ G02B 9/60 |
| 9,405,099 B2 | 8/2016 | Jo et al. |
| 9,438,792 B2 | 9/2016 | Nakada et al. |
| 9,488,802 B2 | 11/2016 | Chen et al. |
| 9,568,712 B2* | 2/2017 | Dror ........................ G02B 9/60 |
| 9,678,310 B2 | 6/2017 | Iwasaki et al. |
| 9,817,213 B2 | 11/2017 | Mercado |
| 9,857,568 B2* | 1/2018 | Dror .................. G02B 13/0045 |
| 2005/0141103 A1 | 6/2005 | Nishina |
| 2005/0168840 A1 | 8/2005 | Kobayashi et al. |
| 2006/0187312 A1 | 8/2006 | Labaziewicz et al. |
| 2007/0229983 A1 | 10/2007 | Saori |
| 2007/0229987 A1 | 10/2007 | Shinohara |
| 2008/0166115 A1 | 7/2008 | Sachs et al. |
| 2008/0187310 A1 | 8/2008 | Jenson et al. |
| 2008/0218613 A1 | 9/2008 | Jenson et al. |
| 2008/0304161 A1 | 12/2008 | Souma |
| 2009/0002839 A1 | 1/2009 | Sato |
| 2009/0122423 A1 | 5/2009 | Park et al. |
| 2010/0254029 A1 | 10/2010 | Shinohara |
| 2010/0277269 A1 | 11/2010 | Lawrence |
| 2011/0001838 A1 | 1/2011 | Lee |
| 2011/0080487 A1 | 4/2011 | Vankataraman et al. |
| 2011/0115965 A1 | 5/2011 | Engelhardt et al. |
| 2012/0087020 A1 | 4/2012 | Tang et al. |
| 2012/0092777 A1 | 4/2012 | Tochigi et al. |
| 2012/0105708 A1 | 5/2012 | Hagiwara |
| 2012/0154929 A1 | 6/2012 | Tsai et al. |
| 2012/0314296 A1 | 12/2012 | Shabtay et al. |
| 2013/0003195 A1 | 1/2013 | Kubota et al. |
| 2013/0038947 A1 | 2/2013 | Tsai et al. |
| 2013/0208178 A1 | 8/2013 | Park |
| 2013/0286488 A1 | 10/2013 | Chae |
| 2014/0022436 A1 | 1/2014 | Kim et al. |
| 2014/0029116 A1 | 1/2014 | Tsai et al. |
| 2014/0204480 A1 | 7/2014 | Jo et al. |
| 2014/0285907 A1 | 9/2014 | Tang et al. |
| 2014/0293453 A1 | 10/2014 | Ogino |
| 2014/0362274 A1 | 12/2014 | Christie et al. |
| 2015/0029601 A1 | 1/2015 | Dror et al. |
| 2015/0085174 A1 | 3/2015 | Shabtay et al. |
| 2015/0116569 A1 | 4/2015 | Mercado |
| 2015/0253647 A1 | 9/2015 | Mercado |
| 2016/0085089 A1 | 3/2016 | Mercado |
| 2016/0187631 A1 | 6/2016 | Choi et al. |
| 2016/0313537 A1 | 10/2016 | Mercado |
| 2017/0102522 A1 | 4/2017 | Jo |
| 2017/0115471 A1 | 4/2017 | Shinohara |
| 2018/0224630 A1 | 8/2018 | Lee et al. |

(56) References Cited

U.S. PATENT DOCUMENTS

| | | | |
|---|---|---|---|
| 2018/0275374 A1* | 9/2018 | Dror | G02B 13/0045 |
| 2018/0275375 A1* | 9/2018 | Dror | G02B 13/0045 |

FOREIGN PATENT DOCUMENTS

| | | |
|---|---|---|
| JP | 1976016135 | 5/1976 |
| JP | 1979003617 A | 1/1979 |
| JP | S54157620 A | 12/1979 |
| JP | S59121015 A | 7/1984 |
| JP | 1995113952 | 5/1995 |
| JP | 2007306282 | 11/2007 |
| JP | 2007306282 A | 11/2007 |
| JP | 2008064884 | 3/2008 |
| JP | 2008122900 | 5/2008 |
| JP | 2011138175 | 7/2011 |
| JP | 2012203234 A | 10/2012 |
| JP | 2013106289 A | 5/2013 |
| JP | 5741395 | 7/2015 |
| KR | 2010040357 | 4/2010 |
| KR | 20100119673 | 11/2010 |
| KR | 20140023552 A | 2/2014 |
| WO | 2013058111 A1 | 4/2013 |
| WO | 2013063097 A1 | 5/2013 |
| WO | 2013105012 A2 | 7/2013 |
| WO | 2014199338 A2 | 12/2014 |
| WO | 2015015383 A2 | 2/2015 |

OTHER PUBLICATIONS

Consumer Electronic Optics: How small a lens can be? the case of panomorph lenses, Thibault et al., Sep. 2014, 7 pages.

Optical design of camera optics for mobile phones, Steinich et al., 2012, pp. 51-58 (8 pages).

The Optics of Miniature Digital Camera Modules, Bareau et al., 2006, 11 pages.

Modeling and measuring liquid crystal tunable lenses, Peter P. Clark, 2014, 7 pages.

Mobile Platform Optical Design, Peter P. Clark, 2014, 7 pages.

* cited by examiner

MINIATURE TELEPHOTO LENS ASSEMBLY

CROSS REFERENCE TO RELATED APPLICATIONS

This application is a Continuation application of U.S. patent application Ser. No. 15/418,925 filed Jan. 30, 2017, now U.S. Pat. No. 9,857,568, which was a Continuation in Part application of U.S. patent application Ser. No. 15/170,472 filed Jun. 1, 2016, now U.S. Pat. No. 9,568,712, which was a Continuation application of U.S. patent application Ser. No. 14/932,319 filed Nov. 4, 2015, now U.S. Pat. No. 9,402,032, which was a Continuation application of U.S. patent application Ser. No. 14/367,924 filed Jun. 22, 2014, now abandoned, which was a 371 Continuation application of international application PCT/IB2014/062465 filed Jun. 20, 2014, and is related to and claims priority from U.S. Provisional Patent Application No. 61/842,987 filed Jul. 4, 2013, which is incorporated herein by reference in its entirety.

FIELD

Embodiments disclosed herein relate to an optical lens system and lens assembly, and more particularly, to a miniature telephoto lens assembly included in such a system and used in a portable electronic product such as a cellphone.

BACKGROUND

Digital camera modules are currently being incorporated into a variety of host devices. Such host devices include cellular telephones, personal data assistants (PDAs), computers, and so forth. Consumer demand for digital camera modules in host devices continues to grow. Cameras in cellphone devices in particular require a compact imaging lens system for good quality imaging and with a small total track length (TTL). Conventional lens assemblies comprising four lens elements are no longer sufficient for good quality imaging in such devices. The latest lens assembly designs, e.g. as in U.S. Pat. No. 8,395,851, use five lens elements. However, the design in U.S. Pat. No. 8,395,851 suffers from at least the fact that the TTL/EFL (effective focal length) ratio is too large.

Therefore, a need exists in the art for a five lens element optical lens assembly that can provide a small TTL/EFL ratio and better image quality than existing lens assemblies.

SUMMARY

Embodiments disclosed herein refer to an optical lens assembly comprising, in order from an object side to an image side: a first lens element with positive refractive power having a convex object-side surface, a second lens element with negative refractive power having a thickness $d_2$ on an optical axis and separated from the first lens element by a first air gap, a third lens element with negative refractive power and separated from the second lens element by a second air gap, a fourth lens element having a positive refractive power and separated from the third lens element by a third air gap, and a fifth lens element having a negative refractive power, separated from the fourth lens element by a fourth air gap, the fifth lens element having a thickness $d_5$ on the optical axis.

An optical lens system incorporating the lens assembly may further include a stop positioned before the first lens element, a glass window disposed between the image-side surface of the fifth lens element and an image sensor with an image plane on which an image of the object is formed.

The effective focal length of the lens assembly is marked "EFL" and the total track length on an optical axis between the object-side surface of the first lens element and the electronic sensor is marked "TTL". In all embodiments, TTL is smaller than the EFL, i.e. the TTL/EFL ratio is smaller than 1.0. In some embodiments, the TTL/EFL ratio is smaller than 0.9. In an embodiment, the TTL/EFL ratio is about 0.85. In all embodiments, the lens assembly has an F number F#<3.2. In an embodiment, the focal length of the first lens element f1 is smaller than TTL/2, the first, third and fifth lens elements have each an Abbe number ("Vd") greater than 50, the second and fourth lens elements have each an Abbe number smaller than 30, the first air gap is smaller than $d_2/2$, the third air gap is greater than TTL/5 and the fourth air gap is smaller than 1.5 $d_5$. In some embodiments, the surfaces of the lens elements may be aspheric.

In an optical lens assembly disclosed herein, the first lens element with positive refractive power allows the TTL of the lens system to be favorably reduced. The combined design of the first, second and third lens elements plus the relative short distances between them enable a long EFL and a short TTL. The same combination, together with the high dispersion (low Vd) for the second lens element and low dispersion (high Vd) for the first and third lens elements, also helps to reduce chromatic aberration. In particular, the ratio TTL/EFL<1.0 and minimal chromatic aberration are obtained by fulfilling the relationship $1.2\times|f3|>|f2|>1.5\times f1$, where "f" indicates the lens element effective focal length and the numerals 1, 2, 3, 4, 5 indicate the lens element number.

The conditions TTL/EFL<1.0 and F#<3.2 can lead to a large ratio L11/L1e (e.g. larger than 4) between the largest width (thickness) L11 and the smallest width (thickness) of the first lens element (facing the object) L1e. The largest width is along the optical axis and the smallest width is of a flat circumferential edge of the lens element. L11 and L1e are shown in each of elements 102, 202 and 302. A large L11/L1e ratio (e.g. >4) impacts negatively the manufacturability of the lens and its quality. Advantageously, the present inventors have succeeded in designing the first lens element to have a L11/L1e ratio smaller than 4, smaller than 3.5, smaller than 3.2, smaller than 3.1 (respectively 3.01 for element 102 and 3.08 for element 302) and even smaller than 3.0 (2.916 for element 202). The significant reduction in the L11/L1e ratio improves the manufacturability and increases the quality of lens assemblies disclosed herein.

The relatively large distance between the third and the fourth lens elements plus the combined design of the fourth and fifth lens elements assist in bringing all fields' focal points to the image plane. Also, because the fourth and fifth lens elements have different dispersions and have respectively positive and negative power, they help in minimizing chromatic aberration.

DETAILED DESCRIPTION

Figure 1A:
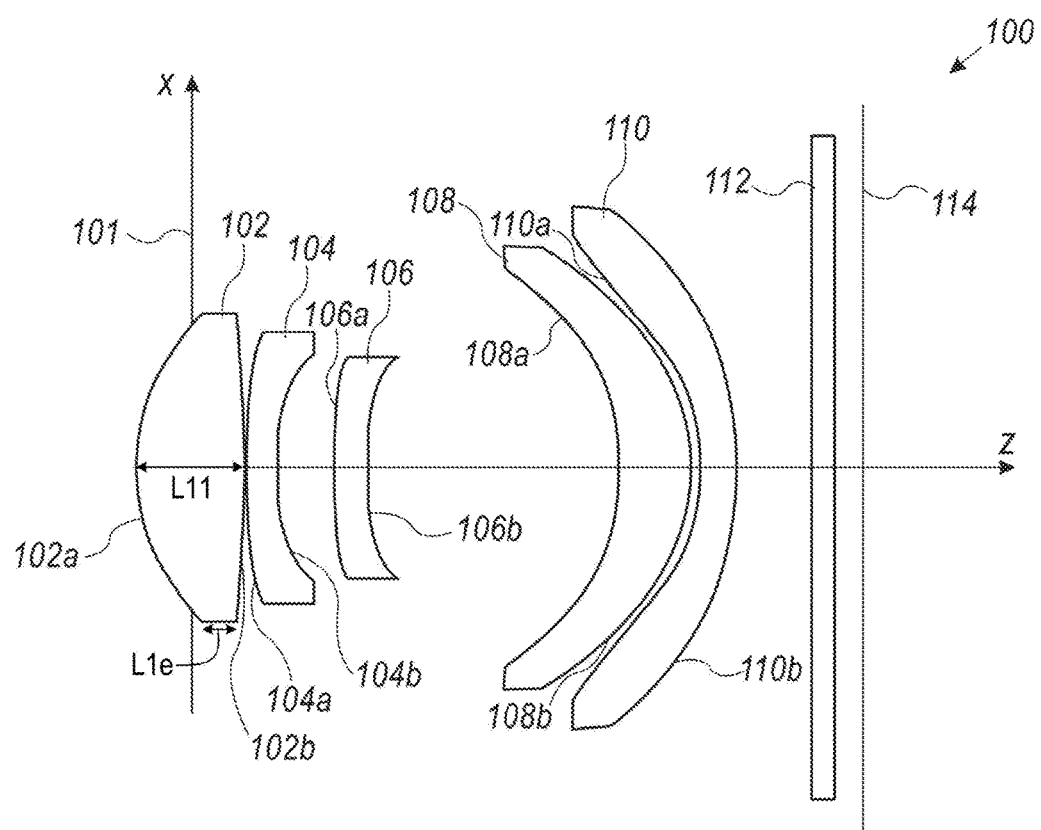
FIG. 1A shows a first embodiment of an optical lens system disclosed herein.
Figure 1B:
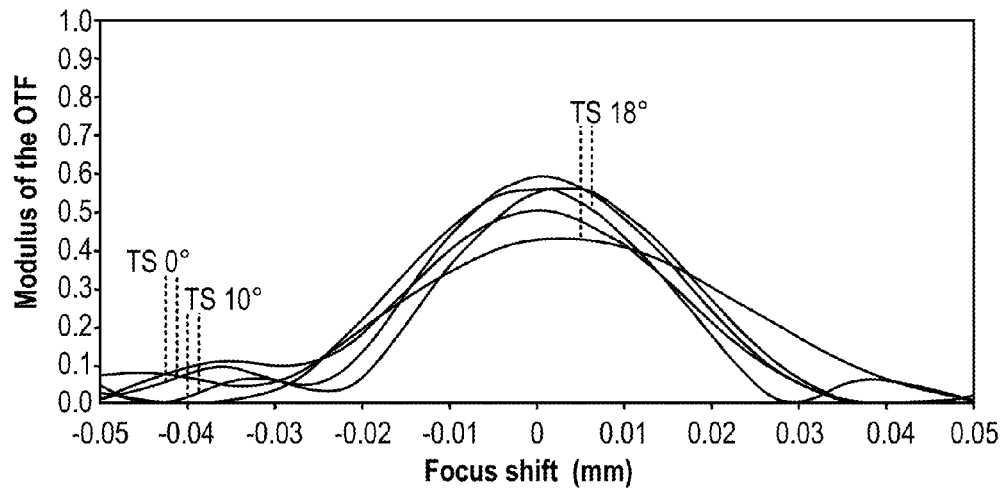
FIG. 1B shows the modulus of the optical transfer function (MTF) vs. focus shift of the entire optical lens assembly for various fields in the first embodiment.
Figure 1C:
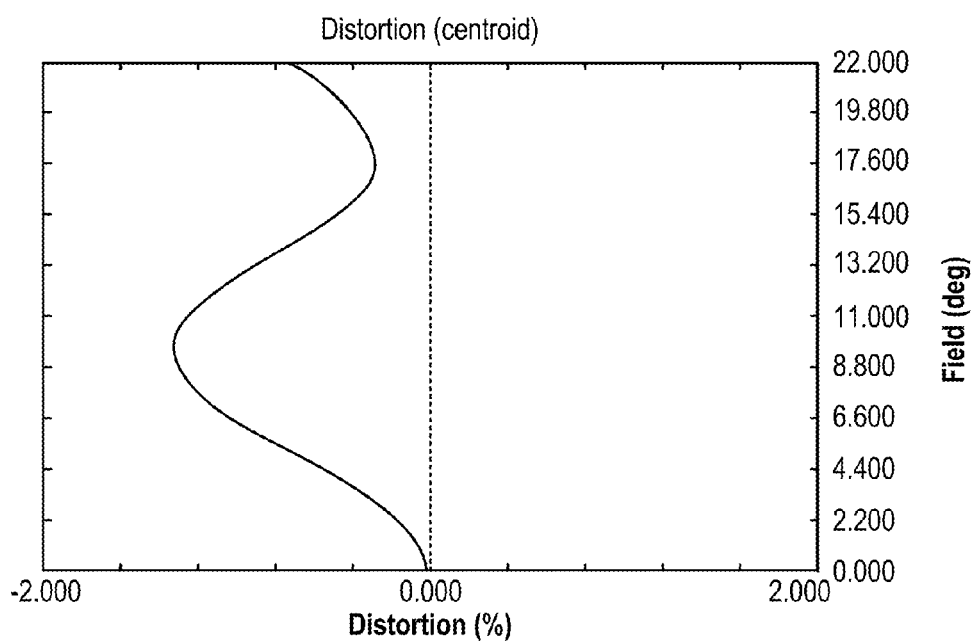
FIG. 1C shows the distortion vs. field angle (+Y direction) in percent in the first embodiment.

In the following description, the shape (convex or concave) of a lens element surface is defined as viewed from the respective side (i.e. from an object side or from an image side). FIG. 1A shows a first embodiment of an optical lens system disclosed herein and marked 100. FIG. 1B shows the MTF vs. focus shift of the entire optical lens system for various fields in embodiment 100. FIG. 1C shows the distortion +Y in percent vs. field. Embodiment 100 comprises in order from an object side to an image side: an optional stop 101; a first plastic lens element 102 with positive refractive power having a convex object-side surface 102a and a convex or concave image-side surface 102b; a second plastic lens element 104 with negative refractive power and having a meniscus convex object-side surface 104a, with an image side surface marked 104b; a third plastic lens element 106 with negative refractive power having a concave object-side surface 106a with an inflection point and a concave image-side surface 106b; a fourth plastic lens element 108 with positive refractive power having a positive meniscus, with a concave object-side surface marked 108a and an image-side surface marked 108b; and a fifth plastic lens element 110 with negative refractive power having a negative meniscus, with a concave object-side surface marked 110a and an image-side surface marked 110b. The optical lens system further comprises an optional glass window 112 disposed between the image-side surface 110b of fifth lens element 110 and an image plane 114 for image formation of an object. Moreover, an image sensor (not shown) is disposed at image plane 114 for the image formation.

In embodiment 100, all lens element surfaces are aspheric. Detailed optical data is given in Table 1, and the aspheric surface data is given in Table 2, wherein the units of the radius of curvature (R), lens element thickness and/or distances between elements along the optical axis and diameter are expressed in mm. "Nd" is the refraction index. The equation of the aspheric surface profiles is expressed by:

$$z = \frac{cr^2}{1+\sqrt{1-(1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14}$$

where r is distance from (and perpendicular to) the optical axis, k is the conic coefficient, c=1/R where R is the radius of curvature, and a are coefficients given in Table 2. In the equation above as applied to embodiments of a lens assembly disclosed herein, coefficients $\alpha_1$ and $\alpha_7$ are zero. Note that the maximum value of r "max r"=Diameter/2. Also note that Table 1 (and in Tables 3 and 5 below), the distances between various elements (and/or surfaces) are marked "Lmn" (where m refers to the lens element number, n=1 refers to the element thickness and n=2 refers to the air gap to the next element) and are measured on the optical axis z, wherein the stop is at z=0. Each number is measured from the previous surface. Thus, the first distance −0.466 mm is measured from the stop to surface 102a, the distance L11 from surface 102a to surface 102b (i.e. the thickness of first lens element 102) is 0.894 mm, the gap L12 between surfaces 102b and 104a is 0.020 mm, the distance L21 between surfaces 104a and 104b (i.e. thickness d2 of second lens element 104) is 0.246 mm, etc. Also, L21=$d_2$ and L51=$d_5$. L11 for lens element 102 is indicated in FIG. 1A. Also indicated in FIG. 1A is a width L1e of a flat circumferential edge (or surface) of lens element 102. L11 and L1e are also indicated for each of first lens elements 202 and 302 in, respectively, embodiments 200 (FIG. 2A) and 300 (FIG. 3A).

TABLE 1

| # | Comment | Radius R [mm] | Distances [mm] | Nd/Vd | Diameter [mm] |
|---|---------|---------------|----------------|-------|---------------|
| 1 | Stop | Infinite | −0.466 | | 2.4 |
| 2 | L11 | 1.5800 | 0.894 | 1.5345/57.095 | 2.5 |
| 3 | L12 | −11.2003 | 0.020 | | 2.4 |
| 4 | L21 | 33.8670 | 0.246 | 1.63549/23.91 | 2.2 |
| 5 | L22 | 3.2281 | 0.449 | | 1.9 |
| 6 | L31 | −12.2843 | 0.290 | 1.5345/57.095 | 1.9 |
| 7 | L32 | 7.7138 | 2.020 | | 1.8 |
| 8 | L41 | −2.3755 | 0.597 | 1.63549/23.91 | 3.3 |
| 9 | L42 | −1.8801 | 0.068 | | 3.6 |
| 10 | L51 | −1.8100 | 0.293 | 1.5345/57.095 | 3.9 |
| 11 | L52 | −5.2768 | 0.617 | | 4.3 |
| 12 | Window | Infinite | 0.210 | 1.5168/64.17 | 3.0 |
| 13 | | Infinite | 0.200 | | 3.0 |

TABLE 2

| # | Conic coefficient k | $\alpha_2$ | $\alpha_3$ | $\alpha_4$ | $\alpha_5$ | $\alpha_6$ |
|---|---------------------|------------|------------|------------|------------|------------|
| 2 | −0.4668 | 7.9218E−03 | 2.3146E−02 | −3.3436E−02 | 2.3650E−02 | −9.2437E−03 |
| 3 | −9.8525 | 2.0102E−02 | 2.0647E−04 | 7.4394E−03 | −1.7529E−02 | 4.5206E−03 |
| 4 | 10.7569 | −1.9248E−03 | 8.6003E−02 | 1.1676E−02 | −4.0607E−02 | 1.3545E−02 |
| 5 | 1.4395 | 5.1029E−03 | 2.4578E−01 | −1.7734E−01 | 2.9848E−01 | −1.3320E−01 |
| 6 | 0.0000 | 2.1629E−01 | 4.0134E−02 | 1.3615E−02 | 2.5914E−03 | −1.2292E−02 |
| 7 | −9.8953 | 2.3297E−01 | 8.2917E−02 | −1.2725E−01 | 1.5691E−01 | −5.9624E−02 |
| 8 | 0.9938 | −1.3522E−02 | −7.0395E−03 | 1.4569E−02 | −1.5336E−02 | 4.3707E−03 |
| 9 | −6.8097 | −1.0654E−01 | 1.2933E−02 | 2.9548E−04 | −1.8317E−03 | 5.0111E−04 |
| 10 | −7.3161 | −1.8636E−01 | 8.3105E−02 | −1.8632E−02 | 2.4012E−03 | −1.2816E−04 |
| 11 | 0.0000 | −1.1927E−01 | 7.0245E−02 | −2.0735E−02 | 2.6418E−03 | −1.1576E−04 |

Embodiment 100 provides a field of view (FOV) of 44 degrees, with EFL=6.90 mm, F#=2.80 and TTL of 5.904 mm. Thus and advantageously, the ratio TTL/EFL=0.855. Advantageously, the Abbe number of the first, third and fifth lens element is 57.095. Advantageously, the first air gap between lens elements 102 and 104 (the gap between surfaces 102*b* and 104*a*) has a thickness (0.020 mm) which is less than a tenth of thickness $d_2$ (0.246 mm). Advantageously, the Abbe number of the second and fourth lens elements is 23.91. Advantageously, the third air gap between lens elements 106 and 108 has a thickness (2.020 mm) greater than TTL/5 (5.904/5 mm). Advantageously, the fourth air gap between lens elements 108 and 110 has a thickness (0.068 mm) which is smaller than $1.5d_5$ (0.4395 mm).

The focal length (in mm) of each lens element in embodiment 100 is as follows: f1=2.645, f2=−5.578, f3=−8.784, f4=9.550 and f5=−5.290. The condition 1.2×|f3|>|f2|<1.5×f1 is clearly satisfied, as 1.2×8.787>5.578>1.5×2.645. f1 also fulfills the condition f1<TTL/2, as 2.645<2.952.

Using the data from row #2 in Tables 1 and 2, L1e in lens element 102 equals 0.297 mm, yielding a center-to-edge thickness ratio L11/L1e of 3.01.

Figure 2A:
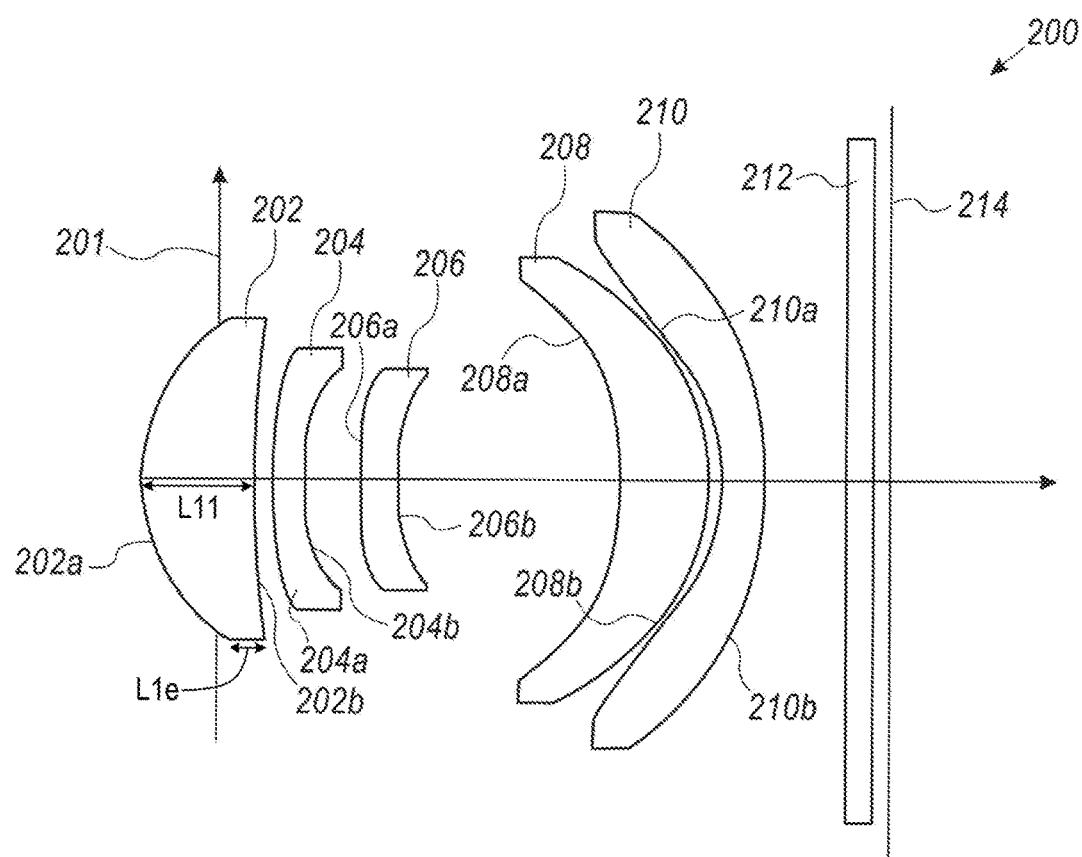
FIG. 2A shows a second embodiment of an optical lens system disclosed herein.
Figure 2B:
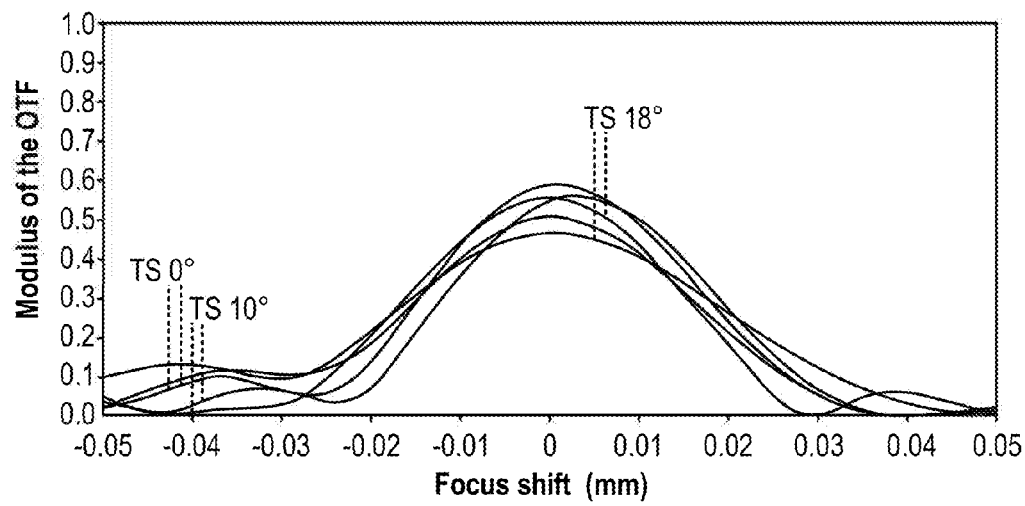
FIG. 2B shows the MTF vs. focus shift of the entire optical lens assembly for various fields in the second embodiment.
Figure 2C:
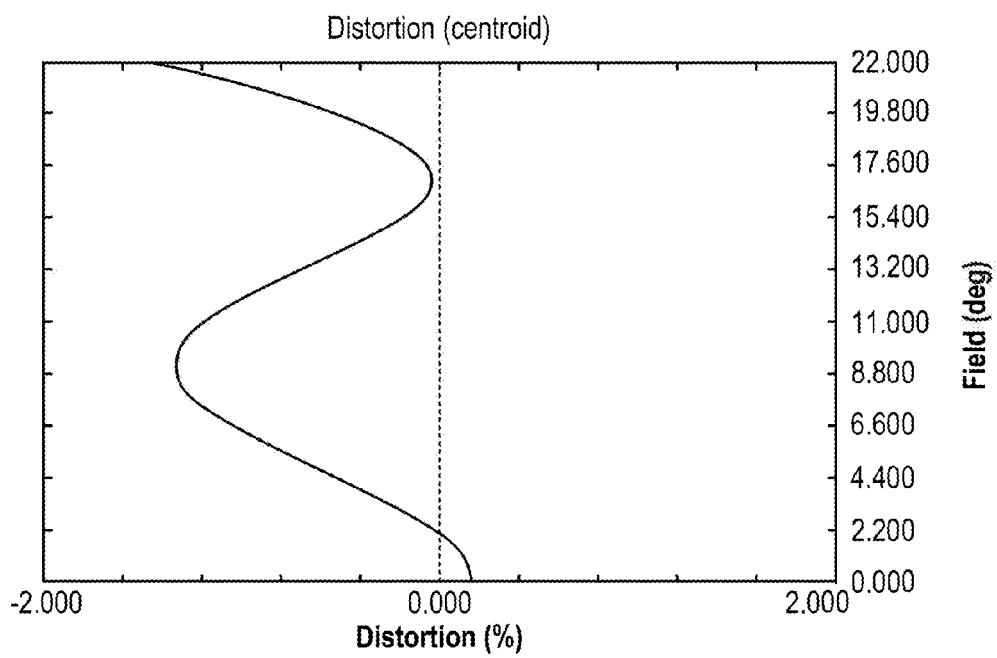
FIG. 2C shows the distortion +Y in percent in the second embodiment.
Figure 3A:
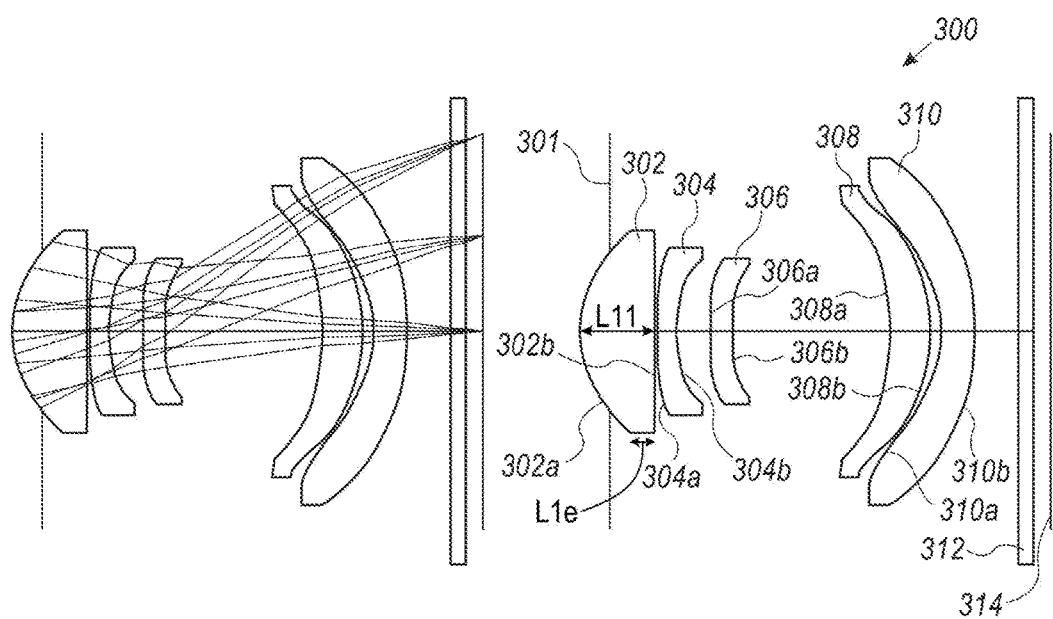
FIG. 3A shows a third embodiment of an optical lens system disclosed herein.

FIG. 2A shows a second embodiment of an optical lens system disclosed herein and marked 200. FIG. 2B shows the MTF vs. focus shift of the entire optical lens system for various fields in embodiment 200. FIG. 2C shows the distortion +Y in percent vs. field. Embodiment 200 comprises in order from an object side to an image side: an optional stop 201; a first plastic lens element 202 with positive refractive power having a convex object-side surface 202*a* and a convex or concave image-side surface 202*b*; a second glass lens element 204 with negative refractive power, having a meniscus convex object-side surface 204*a*, with an image side surface marked 204*b*; a third plastic lens element 206 with negative refractive power having a concave object-side surface 206*a* with an inflection point and a concave image-side surface 206*b*; a fourth plastic lens element 208 with positive refractive power having a positive meniscus, with a concave object-side surface marked 208*a* and an image-side surface marked 208*b*; and a fifth plastic lens element 210 with negative refractive power having a negative meniscus, with a concave object-side surface marked 110*a* and an image-side surface marked 210*b*. The optical lens system further comprises an optional glass window 212 disposed between the image-side surface 210*b* of fifth lens element 210 and an image plane 214 for image formation of an object.

In embodiment 200, all lens element surfaces are aspheric. Detailed optical data is given in Table 3, and the aspheric surface data is given in Table 4, wherein the markings and units are the same as in, respectively, Tables 1 and 2. The equation of the aspheric surface profiles is the same as for embodiment 100.

TABLE 3

| # | Comment | Radius R [mm] | Distances [mm] | Nd/Vd | Diameter [mm] |
|---|---------|---------------|----------------|-------|---------------|
| 1 | Stop    | Infinite      | −0.592         |       | 2.5           |
| 2 | L11     | 1.5457        | 0.898          | 1.53463/56.18 | 2.6 |
| 3 | L12     | −127.7249     | 0.129          |       | 2.6           |
| 4 | L21     | 6.6065        | 0.251          | 1.91266/20.65 | 2.1 |
| 5 | L22     | 2.8090        | 0.443          |       | 1.8           |
| 6 | L31     | 9.6183        | 0.293          | 1.53463/56.18 | 1.8 |
| 7 | L32     | 3.4694        | 1.766          |       | 1.7           |
| 8 | L41     | −2.6432       | 0.696          | 1.632445/23.35 | 3.2 |
| 9 | L42     | −1.8663       | 0.106          |       | 3.6           |
| 10 | L51    | −1.4933       | 0.330          | 1.53463/56.18 | 3.9 |
| 11 | L52    | −4.1588       | 0.649          |       | 4.3           |
| 12 | Window | Infinite      | 0.210          | 1.5168/64.17 | 5.4 |
| 13 |        | Infinite      | 0.130          |       | 5.5           |

TABLE 4

| # | Conic coefficient k | $\alpha_2$ | $\alpha_3$ | $\alpha_4$ | $\alpha_5$ | $\alpha_6$ |
|---|---------------------|------------|------------|------------|------------|------------|
| 2  | 0.0000   | −2.7367E−03 | 2.8779E−04  | −4.3661E−03 | 3.0069E−03  | −1.2282E−03 |
| 3  | −10.0119 | 4.0790E−02  | −1.8379E−02 | 2.2562E−02  | −1.7706E−02 | 4.9640E−03  |
| 4  | 10.0220  | 4.6151E−02  | 5.8320E−02  | −2.0919E−02 | −1.2846E−02 | 8.8283E−03  |
| 5  | 7.2902   | 3.6028E−02  | 1.1436E−01  | −1.9022E−02 | 4.7992E−03  | −3.4079E−03 |
| 6  | 0.0000   | 1.6639E−01  | 5.6754E−02  | −1.2238E−02 | −1.8648E−02 | 1.9292E−02  |
| 7  | 8.1261   | 1.5353E−01  | 8.1427E−02  | −1.5773E−01 | 1.5303E−01  | −4.6064E−02 |
| 8  | 0.0000   | −3.2628E−02 | 1.9535E−02  | −1.6716E−02 | −2.0132E−03 | 2.0112E−03  |
| 9  | 0.0000   | 1.5173E−02  | −1.2252E−02 | 3.3611E−03  | −2.5303E−03 | 8.4038E−04  |
| 10 | −4.7688  | −1.4736E−01 | 7.6335E−02  | −2.5539E−02 | 5.5897E−03  | −5.0290E−04 |
| 11 | 0.00E+00 | −8.3741E−02 | 4.2660E−02  | −8.4866E−03 | 1.2183E−04  | 7.2785E−05  |

Embodiment 200 provides a FOV of 43.48 degrees, with EFL=7 mm, F#=2.86 and TTL=5.90 mm. Thus and advantageously, the ratio TTL/EFL=0.843. Advantageously, the Abbe number of the first, third and fifth lens elements is 56.18. The first air gap between lens elements 202 and 204 has a thickness (0.129 mm) which is about half the thickness $d_2$ (0.251 mm). Advantageously, the Abbe number of the second lens element is 20.65 and of the fourth lens element is 23.35. Advantageously, the third air gap between lens elements 206 and 208 has a thickness (1.766 mm) greater than TTL/5 (5.904/5 mm). Advantageously, the fourth air gap between lens elements 208 and 210 has a thickness (0.106 mm) which is less than $1.5 \times d_5$ (0.495 mm).

The focal length (in mm) of each lens element in embodiment 200 is as follows: f1=2.851, f2=−5.468, f3=−10.279, f4=7.368 and f5=−4.536. The condition 1.2×|f3|>|f2|<1.5×f1 is clearly satisfied, as 1.2×10.279>5.468>1.5×2.851. f1 also fulfills the condition f1<TTL/2, as 2.851<2.950.

Using the data from row #2 in Tables 3 and 4, L1e in lens element 202 equals 0.308 mm, yielding a center-to-edge thickness ratio L11/L1e of 2.916.

Figure 3B:
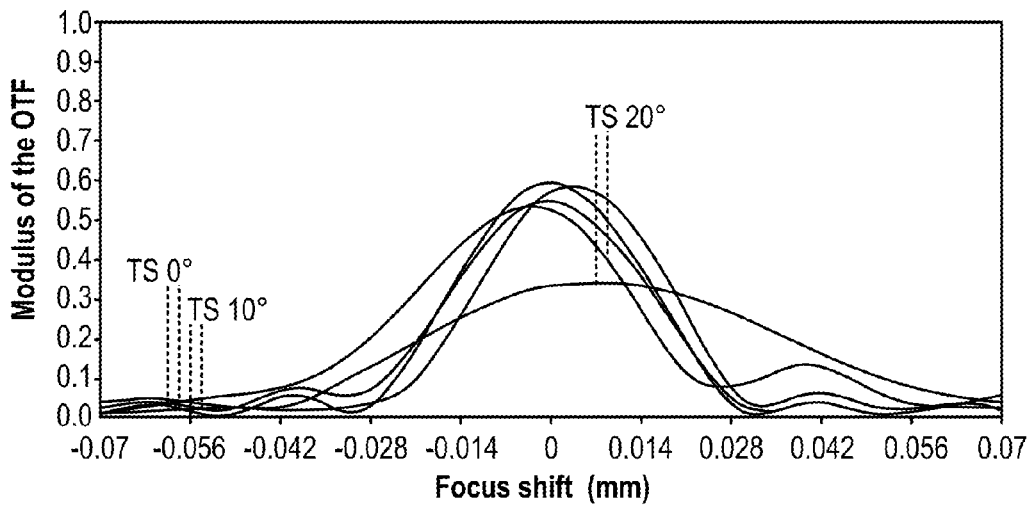
FIG. 3B shows the MTF vs. focus shift of the entire optical lens system for various fields in the third embodiment.
Figure 3C:
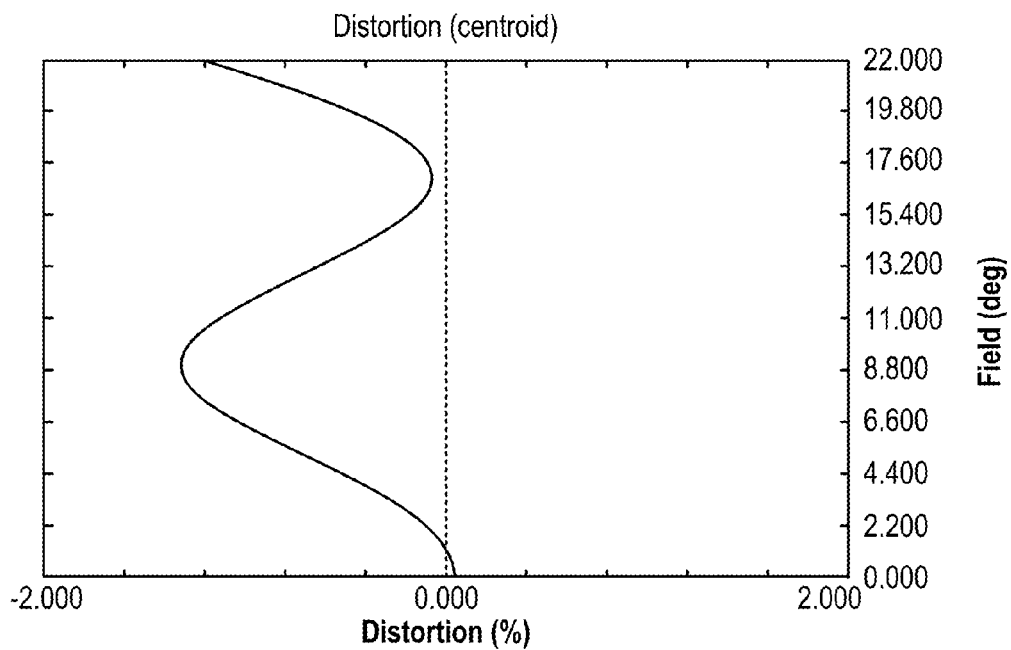
FIG. 3C shows the distortion +Y in percent in the third embodiment.

FIG. 3A shows a third embodiment of an optical lens system disclosed herein and marked 300. FIG. 3B shows MTF vs. focus shift of the entire optical lens system for various fields in embodiment 300. FIG. 3C shows the distortion +Y in percent vs. field. Embodiment 300 comprises in order from an object side to an image side: an optional stop 301; a first glass lens element 302 with positive refractive power having a convex object-side surface 302a and a convex or concave image-side surface 302b; a second plastic lens element 204 with negative refractive power, having a meniscus convex object-side surface 304a, with an image side surface marked 304b; a third plastic lens element 306 with negative refractive power having a concave object-side surface 306a with an inflection point and a concave image-side surface 306b; a fourth plastic lens element 308 with positive refractive power having a positive meniscus, with a concave object-side surface marked 308a and an image-side surface marked 308b; and a fifth plastic lens element 310 with negative refractive power having a negative meniscus, with a concave object-side surface marked 310a and an image-side surface marked 310b. The optical lens system further comprises an optional glass window 312 disposed between the image-side surface 310b of fifth lens element 310 and an image plane 314 for image formation of an object.

In embodiment 300, all lens element surfaces are aspheric. Detailed optical data is given in Table 5, and the aspheric surface data is given in Table 6, wherein the markings and units are the same as in, respectively, Tables 1 and 2. The equation of the aspheric surface profiles is the same as for embodiments 100 and 200.

TABLE 5

| # | Comment | Radius R [mm] | Distances [mm] | Nd/Vd | Diameter [mm] |
|---|---------|---------------|----------------|-------|---------------|
| 1 | Stop | Infinite | −0.38 | | 2.4 |
| 2 | L11 | 1.5127 | 0.919 | 1.5148/63.1 | 2.5 |
| 3 | L12 | −13.3831 | 0.029 | | 2.3 |
| 4 | L21 | 8.4411 | 0.254 | 1.63549/23.91 | 2.1 |
| 5 | L22 | 2.6181 | 0.426 | | 1.8 |
| 6 | L31 | −17.9618 | 0.265 | 1.5345/57.09 | 1.8 |
| 7 | L32 | 4.5841 | 1.998 | | 1.7 |
| 8 | L41 | −2.8827 | 0.514 | 1.63549/23.91 | 3.4 |
| 9 | L42 | −1.9771 | 0.121 | | 3.7 |
| 10 | L51 | −1.8665 | 0.431 | 1.5345/57.09 | 4.0 |
| 11 | L52 | −6.3670 | 0.538 | | 4.4 |
| 12 | Window | Infinite | 0.210 | 1.5168/64.17 | 3.0 |
| 13 | | Infinite | 0.200 | | 3.0 |

TABLE 6

| # | Conic coefficient k | $\alpha_2$ | $\alpha_3$ | $\alpha_4$ | $\alpha_5$ | $\alpha_6$ |
|---|---------------------|------------|------------|------------|------------|------------|
| 2 | −0.534 | 1.3253E−02 | 2.3699E−02 | −2.8501E−02 | 1.7853E−02 | −4.0314E−03 |
| 3 | −13.473 | 3.0077E−02 | 4.7972E−03 | 1.4475E−02 | −1.8490E−02 | 4.3565E−03 |
| 4 | −10.132 | 7.0372E−04 | 1.1328E−01 | 1.2346E−03 | −4.2655E−02 | 8.8625E−03 |
| 5 | 5.180 | −1.9210E−03 | 2.3799E−01 | −8.8055E−02 | 2.1447E−01 | −1.2702E−01 |
| 6 | 0.000 | 2.6780E−01 | 1.8129E−02 | −1.7323E−02 | 3.7372E−02 | −2.1356E−02 |
| 7 | 10.037 | 2.7660E−01 | −1.0291E−02 | −6.0955E−02 | 7.5235E−02 | −1.6521E−02 |
| 8 | 1.703 | 2.6462E−02 | −1.2633E−02 | −4.7724E−04 | −3.2762E−03 | 1.6551E−03 |
| 9 | −1.456 | 5.7704E−03 | −1.8826E−02 | 5.1593E−03 | −2.9999E−03 | 8.0685E−04 |
| 10 | −6.511 | −2.1699E−01 | 1.3692E−01 | −4.2629E−02 | 6.8371E−03 | −4.1415E−04 |
| 11 | 0.000 | −1.5120E−01 | 8.6614E−02 | −2.3324E−02 | 2.7361E−03 | −1.1236E−04 |

Embodiment 300 provides a FOV of 44 degrees, EFL=6.84 mm, F#=2.80 and TTL=5.904 mm. Thus and advantageously, the ratio TTL/EFL=0.863. Advantageously, the Abbe number of the first lens element is 63.1, and of the third and fifth lens elements is 57.09. The first air gap between lens elements 302 and 304 has a thickness (0.029 mm) which is about $\frac{1}{10}^{th}$ the thickness $d_2$ (0.254 mm). Advantageously, the Abbe number of the second and fourth lens elements is 23.91. Advantageously, the third air gap between lens elements 306 and 308 has a thickness (1.998 mm) greater than TTL/5 (5.904/5 mm). Advantageously, the fourth air gap between lens elements 208 and 210 has a thickness (0.121 mm) which is less than $1.5d_5$ (0.6465 mm).

The focal length (in mm) of each lens element in embodiment 300 is as follows: f1=2.687, f2=−6.016, f3=−6.777, f4=8.026 and f5=−5.090. The condition 1.2×|f3|>|f2|<1.5×f1 is clearly satisfied, as 1.2×6.777>6.016>1.5×2.687. f1 also fulfills the condition f1<TTL/2, as 2.687<2.952.

Using the data from row #2 in Tables 5 and 6, L1e in lens element 302 equals 0.298 mm, yielding a center-to-edge thickness ratio L11/L1e of 3.08.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A lens assembly, comprising: a plurality of refractive lens elements arranged along an optical axis, wherein at least one surface of at least one of the plurality of lens elements is aspheric, wherein the lens assembly has an effective focal length (EFL), wherein a lens system that includes the lens assembly plus a window positioned between the plurality of lens elements and an image plane has a total track length (TTL) of 6.5 millimeters or less, wherein a ratio TTL/EFL is less than 1.0, wherein the plurality of lens elements comprises, in order from an object side to an image side, a first lens element with positive refractive power, a second lens element with negative refractive power, and a third lens element, wherein a focal length f1 of the first lens element is smaller than TTL/2 and wherein a lens assembly F # is smaller than 2.9.

2. The lens assembly of claim 1, wherein the third lens element has negative refractive power.

3. The lens assembly of claim 1, wherein the plurality of refractive lens elements includes five lens elements.

4. The lens assembly of claim 1, wherein the focal length f1, a focal length f2 of the second lens element and a focal length f3 of the third lens element fulfill the condition 1.2×|f3|>|f2|>1.5×f1.

5. The lens assembly of claim 2, wherein the plurality of refractive lens elements includes five lens elements, and wherein a fourth lens element and a fifth lens element have different refractive power signs.

6. The lens assembly of claim 3, wherein a fourth lens element and a fifth lens element have different refractive power signs.

7. The lens assembly of claim 3, wherein a fourth lens element and a fifth lens element are separated by an air gap smaller than TTL/20.

8. The lens assembly of claim 3, wherein one of a fourth lens element and a fifth lens element is characterized by an Abbe number smaller than 30 and wherein the other of the fourth lens element and the fifth lens element is characterized by an Abbe number greater than 50.

9. The lens assembly of claim 5, wherein the third lens element and the fourth lens element are separated by an air gap greater than TTL/5, wherein the fourth lens element and the fifth lens element are separated by an air gap smaller than TTL/20, wherein one of the fourth lens element and the fifth lens element is characterized by an Abbe number smaller than 30, and wherein the other of the fourth lens element and the fifth lens element is characterized by an Abbe number greater than 50.

10. The lens assembly of claim 6, wherein the third lens element and the fourth lens element are separated by an air gap greater than TTL/5, wherein the fourth lens element and the fifth lens element are separated by an air gap smaller than TTL/20, wherein one of the fourth lens element and the fifth lens element is characterized by an Abbe number smaller than 30, and wherein the other of the fourth lens element and the fifth lens element is characterized by an Abbe number greater than 50.

11. A lens assembly, comprising: a plurality of refractive lens elements arranged along an optical axis, wherein at least one surface of at least one of the plurality of lens elements is aspheric, wherein the lens assembly has an effective focal length (EFL), wherein a lens system that includes the lens assembly plus a window positioned between the plurality of lens elements and an image plane has a total track length (TTL) of 6.5 millimeters or less, wherein a ratio TTL/EFL is less than 1.0, wherein the plurality of lens elements comprises, in order from an object side to an image side, a first lens element with positive refractive power and a focal length f1, a second lens element with negative refractive power and a focal length f2, and a third lens element with a focal length f3, wherein the focal length f1, the focal length f2 and the focal length f3 fulfill the condition $1.2\times|f3|>|f2|>1.5\times f1$, and wherein a lens assembly F # is smaller than 2.9.

12. The lens assembly of claim 11, wherein the third lens element has negative refractive power.

13. The lens assembly of claim 11, wherein the plurality of refractive lens elements includes five lens elements.

14. The lens assembly of claim 12, wherein the plurality of refractive lens elements includes five lens elements, and wherein a fourth lens element and a fifth lens element have different refractive power signs.

15. The lens assembly of claim 13, wherein a fourth lens element and a fifth lens element have different refractive power signs.

16. The lens assembly of claim 13, wherein a fourth lens element and a fifth lens element are separated by an air gap smaller than TTL/20.

17. The lens assembly of claim 13, wherein one of a fourth lens element and a fifth lens element is characterized by an Abbe number smaller than 30 and wherein the other of the fourth lens element and the fifth lens element is characterized by an Abbe number greater than 50.

18. A lens assembly, comprising: five refractive lens elements arranged along an optical axis, wherein at least one surface of at least one of the lens elements is aspheric wherein the lens assembly has an effective focal length (EFL), a total track length (TTL) of 6.5 millimeters or less and a ratio TTL/EFL of less than 1.0, wherein the lens elements comprises, in order from an object side to an image side, a first lens element with positive refractive power, a second lens element with negative refractive power, a third lens element and a fourth lens element, wherein the third lens element and the fourth lens element are separated by an air gap greater than TTL/5 and wherein a lens assembly F # is smaller than 2.9.

19. The lens assembly of claim 18, wherein the third lens element has negative refractive power.

20. The lens assembly of claim 18, wherein the fourth lens element and a fifth lens element have different refractive power signs.

21. The lens assembly of claim 18, wherein the fourth lens element and the fifth lens element are separated by an air gap smaller than TTL/20.

22. The lens assembly of claim 18, wherein one of the fourth lens element and a fifth lens element is characterized by an Abbe number smaller than 30 and wherein the other of the fourth lens element and the fifth lens element is characterized by an Abbe number greater than 50.

23. The lens assembly of claim 18, wherein a focal length f1 of the first lens element is smaller than TTL/2.

24. The lens assembly of claim 19, wherein the fourth lens element and a fifth lens element have different refractive power signs.

* * * * *